June 28, 1927.
A. LANGSNER
SURVEYING INSTRUMENT
Filed May 17, 1926
1,633,749
2 Sheets-Sheet 2
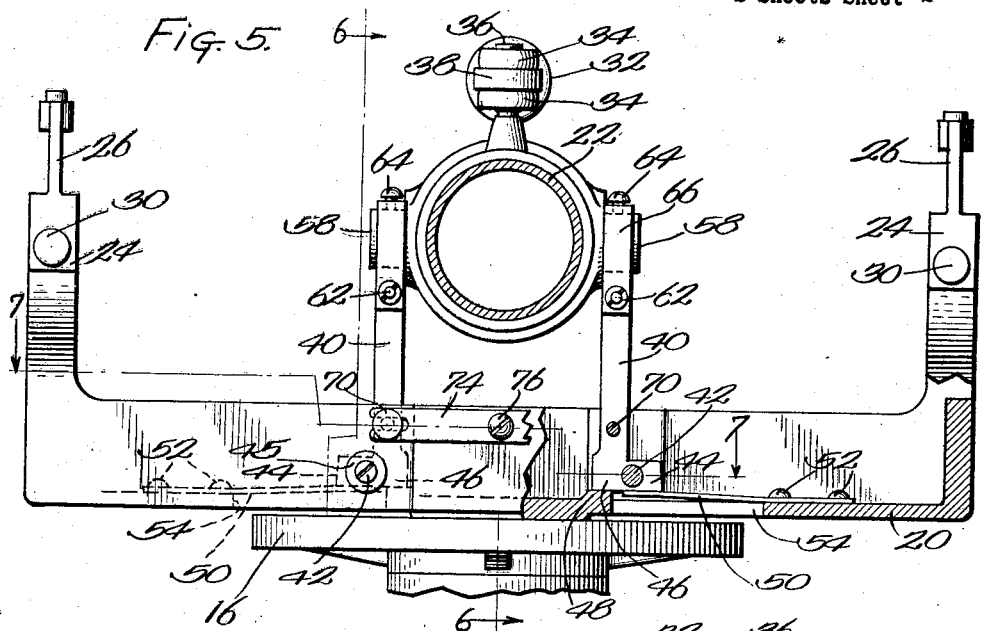
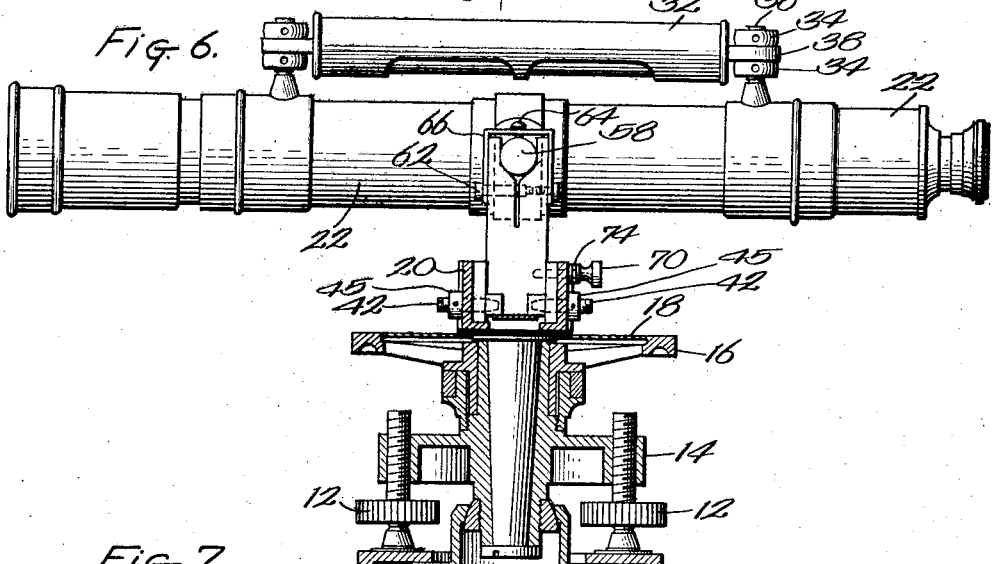
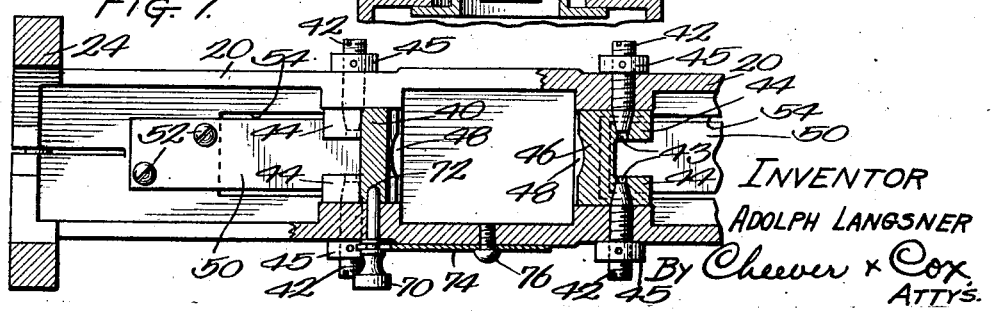
INVENTOR
ADOLPH LANGSNER
By Cheever & Cox
ATTYS.

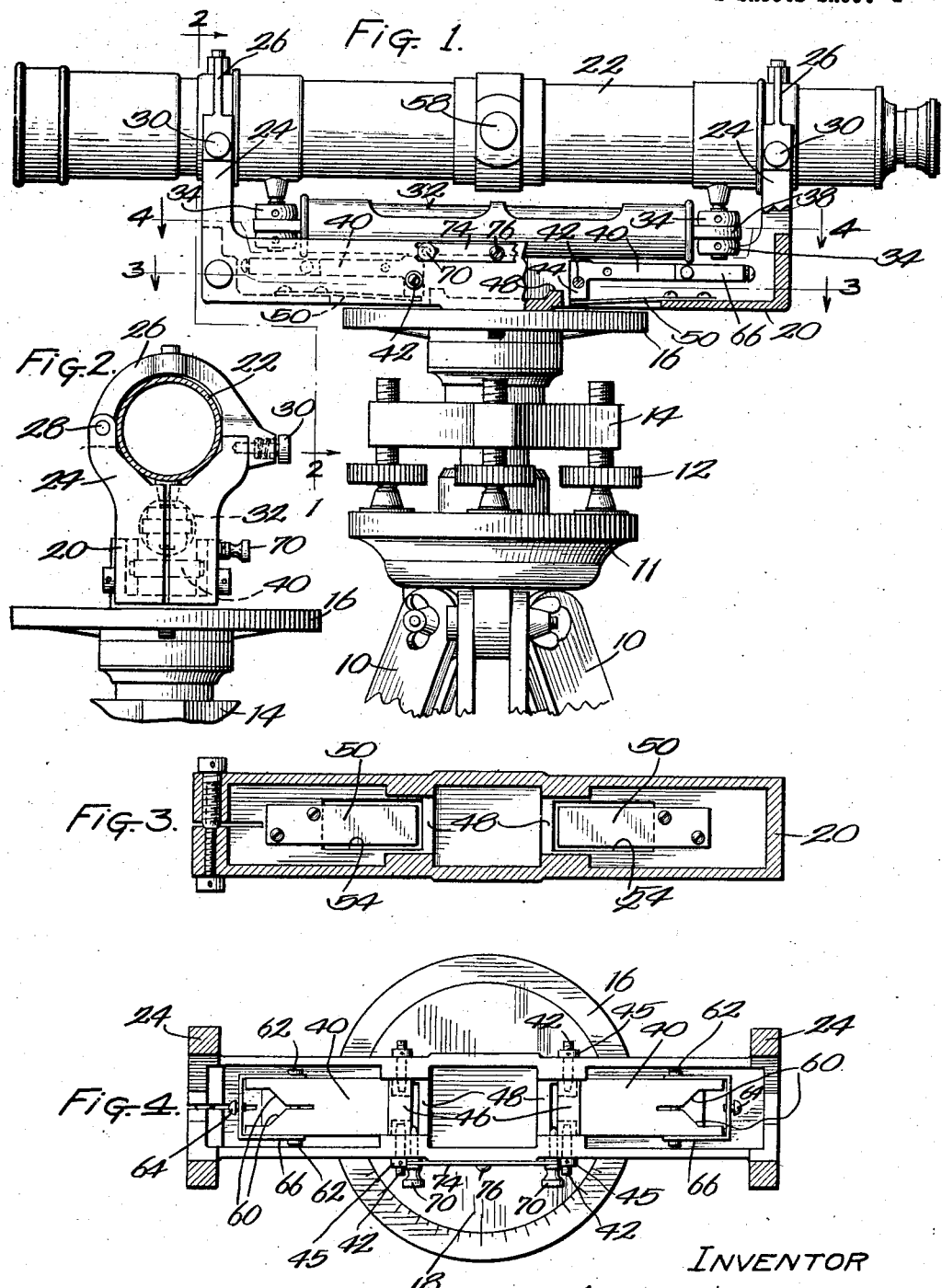

Patented June 28, 1927.

1,633,749

UNITED STATES PATENT OFFICE.

ADOLPH LANGSNER, OF CHICAGO, ILLINOIS, ASSIGNOR TO EUGENE DIETZGEN CO., OF CHICAGO, ILLINOIS, A CORPORATION OF DELAWARE.

SURVEYING INSTRUMENT.

Application filed May 17, 1926. Serial No. 109,477.

My invention relates to surveying instruments and is embodied more particularly in a convertible level and transit. The object of the invention is to provide a construction such that when the instrument is converted to the form used for leveling, the level itself will be fully and clearly in view. More specifically, my purpose is to provide special standards which may be used for supporting the telescope when the instrument is to be used as a transit, which standards can be folded back out of the way and out of sight when the instrument is to be used as a leveling instrument. Another object is to provide means whereby the telescope may be adjusted vertically within the wyes which support it when the instrument is used as a leveling instrument. Still another object of my invention resides in the means for retaining the supporting arms or standards in either upstanding or in disappearing position.

I accomplish my objects by the construction shown in the accompanying drawings, in which—

Figure 1 is a side elevation of the instrument showing the same converted to be used as a leveling instrument.

Figure 2 is a sectional elevation on the line 2—2 Figure 1.

Figure 3 is a plan section on the line 3—3 Figure 1.

Figure 4 is a plan section on the line 4—4 Figure 1.

Figure 5 is a front elevation partly in section showing the position of the parts when the standards are erect and the telescope is mounted in them, thus to convert the instrument to a transit.

Figure 6 is a sectional elevation on the line 6—6 Figure 5.

Figure 7 is a plan section on the irregular line 7—7 Fig. 5.

Like numerals denote like parts throughout the several views.

The instrument is mounted upon the usual tripod having legs 10 supporting a base 11. Above this are leveling screws 12 which support a platform 14. Above this is a "circle" 16. This is marked with suitable graduations and surrounds a rotatable disc 18. These parts are all of known construction in instruments of this class and need not be described in detail.

Above disc 18 is a channeled bar 20 which is rotatable about the vertical axis of the instrument and is adapted to support the telescope 22 when the instrument is set up as a level. The telescope rests in wyes 24 provided with the usual clips 26 for holding the telescope seated. The clips are pivoted on pins 28 and held closed by locking pins 30. These parts are known and hence need no further description. The telescope is provided with the usual spirit level 32, which is adjustably secured by lock nuts 34 working on screws 36 and engaging ears 38 formed on the end of the spirit level in the usual way. When the instrument is set up as a leveling instrument the spirit level hangs beneath the telescope as shown in Figures 1 and 2, the level coming between the sides of the channeled main bar 20 previously mentioned.

Now to describe the mechanism by virtue of which the instrument can also be employed as a transit:

The channel 20 is provided with two standards 40 pivoted between the sides of the bar by means of pins 42. In the preferred construction shown in plan section in Figure 7 these pins are threaded and screw into the sides of bar 20. They are conically tapered at their inner end to fit into correspondingly tapered sockets 43 formed in the sides of the standards. They are held against rotation by lock nuts 45. As the result of this construction the pivot pins can always be adjusted to create as much or as little friction as desired. Furthermore the bearings can always be tightened to compensate for wear.

Each standard has a foot 44 extending outward from the pins 42 and a shoulder 46 extending inward and designed to engage a boss 48 formed near the center of the channeled bar as shown in detail in Figure 5. The standards are held upright by means of leaf springs 50 which underlie them and are secured by means of screws 52 or other fastening devices. In order to afford freedom of action to the springs, the bottom of the bar 20 is slotted at the points 54 beneath the free end of the springs, although this is a detail of construction which obviously may be varied without departing from the spirit of the invention.

At the upper end the standards 40 are bifurcated to form wyes for supporting the trunnions 58 formed on the sides of the telescope between its ends in the usual manner. The preferred outline is shown in Figure 4 in which the trunnion wyes are shown folded back in horizontal, non-acting position. The notched ends have beveled sides 60 and within a reasonable degree the height of the trunnions may be regulated by adjusting the branches of the wyes toward or from each other. Such adjustment is effected by means of transverse screws 62 which are capable of drawing the sides of the wyes together or permitting them to spring apart.

The trunnions are held seated in the standards 40 by set screws 64 carried by clips 66 pivoted to the sides of the standards by means of the aforesaid pins 62.

In order to make it certain that the standards 40 will maintain their upright position when in use it is desirable to provide locking pins 70, one of which is shown in plan in Figure 7. These pins are slidably mounted in one side of the channeled bar 20 and enter sockets 72 formed in the side of the standards. The pins are yieldingly held in acting position by means of a leaf spring 74 held in position against the outside of the bar by a screw 76. As a result of this construction the pins are normally urged to acting position but may be temporarily withdrawn to release the standards, to permit them to be folded back and down to non-acting position where they are hidden from view.

In practice when the instrument is to be used as a level it is assembled and adjusted in the manner shown in Figures 1 to 4 with the telescope seated in the wyes 24 and the spirit level 32 hanging pendant. The standards 40 are folded down out of the way, and it will be evident that the instrument may be used as a leveling instrument in the usual way. If, now, it is desired to convert the instrument to a transit the clips 26 are thrown back, and the telescope is lifted out, after which the clips are again lowered to normal position. Then the standards 40 are swung to upstanding position as shown in Figures 5 to 7. They are locked in this position by means of the locking pins 70. The springs 50 automatically retain or hold the standards in either vertical or horizontal position sufficiently to prevent accidental displacement under ordinary circumstances, but the pins 70 are positive locks used when the standards are in acting position. When the standards have thus been locked in upright position the trunnions 58 are lowered onto the beveled surfaces 60 in the upper end of the standards, after which the clips 66 are swung up and over the trunnions to hold them seated. In placing the telescope in the standards it is turned over from the position shown in Figure 1 and the spirit level 32 is brought to the top as shown in Figures 5 and 6. The level is not required under these conditions and when it thus lies in elevated position it cannot strike the bar 20 when the telescope is swung in a vertical plane. Thus the instrument can now be used as a transit in the usual manner.

From the foregoing it will be evident that the instrument is not only convertible but that when used as a leveling instrument there is nothing to obscure the operator's view of the level. The standards 40 at this time are swung down out of the way; in fact they are approximately invisible, being housed between the sides of the channeled bar 20. Another advantage is that as the standards are practically a part of the channeled bar and hence a part of the telescope support there is no need of loose or separate elements to be used when the instrument is to become a transit. Furthermore the standards, which enable the instrument to be used as a transit are comparatively small elements and are located directly at the trunnions. There is no necessity for bridging from the main wyes to the trunnions or employing any other expedient of like nature. Thus the construction is simple, convenient to use, and runs little risk of becoming out of order.

Having thus described my invention what I claim as new and desire to secure by Letters Patent is:

1. In an instrument of the class described, a base, a telescope and two pairs of supports on said base for the telescope, one pair of supports being located nearer the center of the base than the other and being hinged to the base and the base being recessed to house the hinged supports when the latter are swung to non-acting position.

2. An instrument of the class described having a base and two separate pairs of supports thereon for alternatively supporting a telescope, one of said pairs being constructed and arranged to be folded into disappearing position on said base when the other pair is supporting the telescope.

3. An instrument of the class described having a channel shaped base provided with uprights adapted to support a telescope, a second pair of supports pivotally mounted within the spaced walls of said channel shaped base and adapted to swing down into the channel of the base into hidden position.

4. A surveying instrument having a telescope provided with a level at the bottom and trunnions at the sides, the level being visible from a point above it, a supporting member rotatable in a horizontal plane whereby the instrument may be used as a leveling device, standards pivoted to said member between its ends for supporting the trunnions to enable the instrument to be used as a transit, said standards being swingable from upright to horizontal position and vice versa, and springs for yieldingly holding the standards in either of their two positions, said standards each having a foot engaged by one of the springs and a shoulder for abutting a portion of the supporting member when the standards are in vertical position.

5. A convertible surveying instrument having a telescope provided with a level and with trunnions, a bar rotatable in a horizontal plane, main supports on said bar adapted to support the telescope to enable the instrument to be used as a level, and supplemental members capable of occupying an erect position for engaging the trunnions, and a prostrate position for clearing the spirit level when not in use, and means for regulating the height of the trunnions in the standards when the latter are in erect position.

6. A convertible level and transit having main supports for the telescope to enable the instrument to be used as a level and supplemental supports for engaging the trunnions when the instrument is to be used as a transit, said supplemental supports being bifurcated and having sloping inner sides, means for drawing the sides toward each other for increasing the height of the trunnions for purposes of adjustment.

7. A surveying instrument having a base provided with supports for engaging the trunnions of the telescope, said supports being bifurcated and formed with sloping inner supporting walls, means for drawing the walls toward each other for adjusting the height of the trunnions, said standards having clips pivoted thereto for holding the trunnions in the seats formed by the sloping walls.

8. A convertible level and transit having a telescope and a channel-shaped base having opposed pairs of perforations, standards mounted within the channel of the base and having conical perforations registering with those of the base, pins threaded through the perforations of the base with their tapered ends projecting into the tapered perforations of the standards, and means for adjustably turning the pins.

In witness whereof, I have hereunto subscribed my name.

ADOLPH LANGSNER.